Patented June 10, 1952

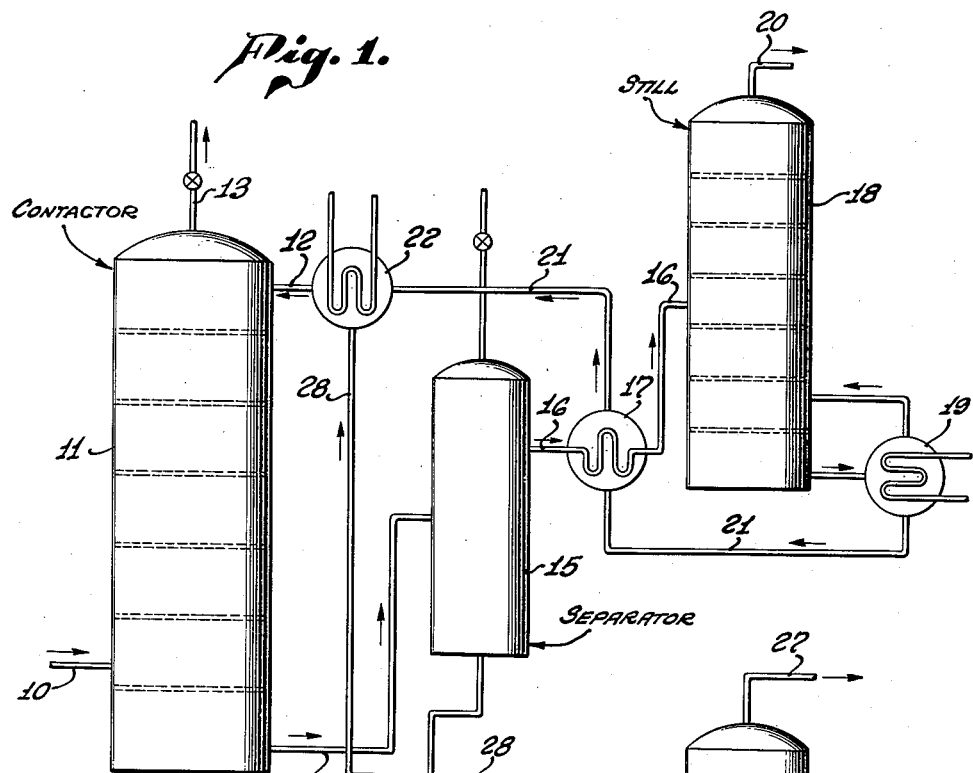
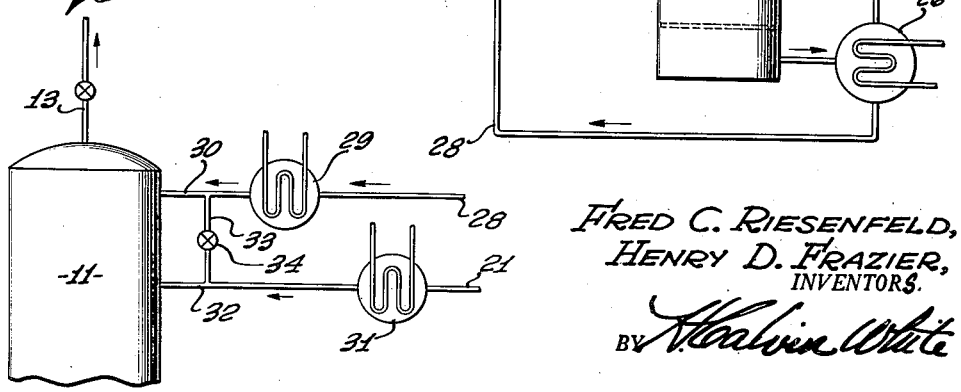

2,600,328

UNITED STATES PATENT OFFICE 2,600,328

SEPARATION OF ACIDIC CONSTITUENTS FROM GASES

Fred C. Riesenfeld, Hollywood, and Henry D. Frazier, Alhambra, Calif., assignors to The Fluor Corporation, Ltd., Los Angeles, Calif., a corporation of California Application June 7, 1948, Serial No. 31,484

7 Claims. (Cl. 23—3)

This invention has to do with the separation of weakly acidic constituents, such as hydrogen sulfide and carbon dioxide, from hydrocarbon or other gases, and is directed particularly to an improved process for selective dissolution of reaction compounds of such constituents, whereby they may be removed from the gas and then separately recovered, all in a continuous absorptive and regenerative cycle.

The invention is especially concerned with the removal of hydrogen sulfide and carbon dioxide from hydrocarbon gases, and contemplates generally the treatment of the gas with an absorbent reactive with the carbon dioxide and hydrogen sulfide, and having then a two liquid phase composition, the individual phases respectively containing absorbed carbon dioxide and hydrogen sulfide. These phases then are separable and capable of individual regeneration to separately release their absorbed acid gases.

We have discovered that solutions containing an aliphatic amine, preferably an alkanolamine, water and a third component compatible or miscible with both, will dissolve the reaction products of the amine with hydrogen sulfide, without however retaining in homogenous solution appreciable quantities of the reaction products of the amine with carbon dioxide. In other words, reaction of the amine and carbon dioxide results in formation of a carbamate which, by virtue of the presence of the aforesaid third component, is rendered separable because of limited solubility of the carbamate in the remaining solution. Accordingly, as such solutions become saturated with carbon dioxide and hydrogen sulfide, they form into two phases separable as upper and lower layers, the former of which contains most of the combined hydrogen sulfide and no appreciable combined carbon dioxide, while the lower layer contains substantially all of the combined carbon dioxide (i. e. carbamate) and some hydrogen sulfide-amine reaction product. The reaction and phase separation effect appears to be that upon reaction with carbon dioxiode, the amine in the initial treating solution separates into the lower phase, and progressively as the reaction occurs because of the substantial insolubility of the reaction product in the upper phase. Thus, upon regeneration, the so-called upper phase releases substantially pure hydrogen sulfide, while the lower phase gives off a substantial quantity of the carbon dioxide content of the treated gas, with perhaps some hydrogen sulfide.

The amine component of the treating solution may be any of the alkanolamines or aliphatic amines known to be reactive with acid gases, see Hutchinson Patent 2,177,068.

The following classes of compounds are found to be suitable diluents or additives soluble in water-amine solutions, the diluent in any instance preferably having a boiling temperature in excess of about 190° C.: Monohydric alcohols, water soluble monoethers of polyhydric alcohols (such as carbitols and Cellosolves and particularly butyl carbitol, butyl Cellosolve and phenyl Cellosolve), and water soluble multiple ethers of polyhydric alcohols such as dimethoxy tetraglycol. In some instances, though not necessarily in all cases, it may be desirable to include a glycol, typically diethylene glycol, in the solution as for the purpose of aiding in maintenance of the amine-hydrogen sulfide reaction product in a condition more completely confined to the upper layer or phase.

The following are cited as typical treating solutions:

*Example 1*

20% Monoethanolamine
10% Water
70% Butyl carbitol

*Example 2*

30% Triethylenetetramine
25% Thio-glycol
35% Carbitol
10% Water

*Example 3*

17% Monoethanolamine
46% Methyl Cellosolve acetate
32% Diethylene glycol
5% Water

*Example 4*

30% Diethylenetriamine
30% Carbitol
35% Diethylene glycol
5% Water

The physical steps and operations employed in carrying out the invention, will be understood more fully by referring to the accompanying drawings illustrating typical treating cycles embodying the invention, and in which:

Fig. 1 is a view illustrating the treating system in flow sheet form; and

Fig. 2 is a fragmentary view showing a variation of the flow cycle.

The gas to be treated may consist typically of a hydrocarbon gas containing substantial quantities of carbon dioxide, hydrogen sulfide and perhaps also some moisture, which incidentally may also be removed, particularly where a hygroscopic diluent such as diethylene glycol is included in the absorbent solution. The sour gas is fed through line 10 to a contactor column 11 through which the gas flows upwardly and in intimate contact with a down-flowing stream of regenerated solution introduced to the column through line 12. The treated gas leaves the contactor through line 13. The rich solution, containing absorbed hydrogen sulfide and carbon dioxide, is discharged through line 14 to a separator 15 within which the solution stratifies. Merely as illustrative, the solution may convert to an upper layer or stratum containing the absorbed hydrogen sulfide, and practically no carbon dioxide, and a lower stratum containing carbon dioxide and a relatively small quantity of hydrogen sulfide.

The upper stratum is discharged from the separator through line 16 and exchanger 17 into a still 18 suitably supplied with heat, as by the conventional reboiler 19. Upon being heated in the still, the solution is stripped of its hydrogen sulfide content, the latter being recoverable from line 20 as high purity hydrogen sulfide. The stripped solution then is returned from the still or reboiler through line 21, exchanger 17 and cooler 22, for recirculation through the contactor.

The lower liquid stratum in separator 15 is discharged through line 23 and exchanger 24 into a second still 25 receiving bottom heat from reboiler 26 at a temperature sufficient for regeneration of the solution. The absorbed acid gas, for the most part carbon dioxide, is released from the column for further disposition through line 27. The lean solution is recirculated through line 28, exchanger 24 and cooler 22, for admixture with the solution being returned from line 21. Being mutually soluble or compatible, the two solutions when introduced together to the contactor, or admixed therein according to the variation described below, constitute a single phase absorbent solution.

In Fig. 2 we illustrate a variation of the described system, by means of which it is possible to more completely absorb hydrogen sulfide from the gas, to effect greater dehydration, and if desired, to lower steam requirements for stripping. This variational flow cycle is similar to the described system except that the regenerated solution leaving reboiler 26 through exchanger 24 and line 28, is passed through a cooler 29, beyond which all or a portion of the solution is introduced through line 30 into the top of the contactor. The regenerated solution leaving reboiler 19 and flowing through line 21 and exchanger 17, is passed through cooler 31 and returned to the contactor 11 through line 32 at a point several trays below the top tray of the contactor, either alone or mixed with a portion of the solution taken from line 30 through line 33 under control of a suitable regulator or valve 34.

Considering the differences in compositions, particularly with reference to hydrogen sulfide, of the solutions in the stills 18 and 25, it will be appreciated that with its initially lower hydrogen sulfide content and aided by the stripping effect of its absorbed carbon dioxide, the solution in still 25 can more easily be stripped to a lower hydrogen sulfide content than the solution being stripped in still 18. Accordingly, by selectively introducing the lean solution from line 28 to the top of the contactor, advantage is taken of the relatively greater purity of this solution in respect of hydrogen sulfide contamination, as a means of effecting more complete hydrogen sulfide absorption in the top trays of the contactor, and therefore greater purity of the treated gas.

Dehydration of the gas is improved for the reason that as concentrated in the shell 25, the lean solution can be made highly hygroscopic by reason of the moisture absorptive properties of the amine in the presence of low water content and the third non-aqueous component or diluent.

Reduction of required total stripping steam is made possible because of permissible incomplete stripping of hydrogen sulfide in the still 18, made possible by the fact that the lean solution taken from the still is introduced to the contactor below its top trays, and at a location where the presence of appreciable hydrogen sulfide in the solution will not impair the purity of the treated gas as determined by the top tray liquid compositions.

We claim:

1. The method of treating a hydrocarbon gas containing hydrogen sulfide and carbon dioxide, that includes contacting the gas in a contacting zone with a monophase liquid absorbent solution comprising an alkanolamine, water and a compound having a boiling temperature above 190° C. and of the group consisting of monohydric alcohols, water soluble ethers of polyhydric alcohols, and water soluble multiple ethers of polyhydric alcohols, in sufficiently high concentration of said compound to cause by reaction of the amine with said hydrogen sulfide and carbon dioxide, the formation of two liquid phases one containing the bulk of the amine-carbon dioxide reaction product and the other the bulk of the amine-hydrogen sulfide reaction product by virtue of the relative insolubility of the amine-carbon dioxide reaction product in the remainder of the solution, separately heating and stripping said phases of their absorbed gases and returning the stripped liquids to said contacting zone.

2. The method claimed in claim 1, in which said monophase solution contains also a glycol.

3. The method of treating a hydrocarbon gas containing hydrogen sulfide and carbon dioxide, that includes contacting the gas in a contacting zone with a monophase liquid absorbent solution comprising an alkanolamine, water and a water soluble ether of a polyhydric alcohol having a boiling temperature in excess of 190° C., thereby reacting the amine with said hydrogen sulfide and carbon dioxide the formation of two liquid phases one containing the bulk of the amine-carbon dioxide reaction product and the other the bulk of the amine-hydrogen sulfide reaction product by virtue of the relative insolubility of the amine-carbon dioxide reaction product in the remainder of the solution, separately heating and stripping said phases of their absorbed gases and returning the stripped liquid to said contacting zone.

4. The method claimed in claim 3, in which said monophase solution contains also a glycol.

5. The method of treating a hydrocarbon gas containing hydrogen sulfide and carbon dioxide, that includes contacting the gas in a contacting zone with a monophase liquid absorbent solution comprising an alkanolamine, water and a compound having a boiling temperature above 190° C. and of the group consisting of monohydric alcohols, water soluble ethers of polyhydric alcohols, and water soluble multiple ethers of polyhydric alcohols, in sufficiently high concentration of said compound to cause by reaction of the amine with said hydrogen sulfide and carbon dioxide the formation of two liquid phases one containing the bulk of the amine-carbon dioxide reaction product and the other the bulk of the amine-hydrogen sulfide reaction product by virtue of the relative insolubility of the amine-carbon dioxide reaction product in the remainder of the solution, separately heating and stripping said phases of their absorbed gases and returning the liquids constituting the hydrogen sulfide and carbon dioxide stripped phases respectively to relatively upper and lower locations in said contacting zone.

6. The method of treating a hydrocarbon gas containing hydrogen sulfide and carbon dioxide, that includes contacting the gas in a contacting zone with a monophase liquid absorbent solution comprising an alkanolamine, water and a compound having a boiling temperature above 190° C. and of the group consisting of monohydric alcohols, water soluble ethers of polyhydric alcohols, and water soluble multiple ethers of polyhydric alcohols in sufficiently high concentration of said compound to cause by reaction of the amine with said hydrogen sulfide and carbon dioxide the formation of two liquid phases, passing the solution and reaction products into a separating zone wherein there is formed said liquid phases one containing the bulk of the amine-carbon dioxide reaction product and the other the bulk of the amine-hydrogen sulfide reaction product by virtue of the relative insolubility of the amine-carbon dioxide reaction product in the remainder of the solution, separately withdrawing and passing the hydrogen sulfide and carbon dioxide reaction product phases respectively through first and second separate heating zones, and returning the stripped liquids from said heating zone to said contacting zone.

7. The method of treating a hydrocarbon gas containing hydrogen sulfide and carbon dioxide, that includes contacting the gas in a contacting zone with a monophase liquid absorbent solution comprising an alkanolamine, water and a compound having a boiling temperature above 190° C. and of the group consisting of monohydric alcohols, water soluble ethers of polyhydric alcohols, and water soluble multiple ethers of polyhydric alcohols in sufficiently high concentration of said compound to cause by reaction of the amine with said hydrogen sulfide and carbon dioxide, passing the solution and reaction products into a separating zone wherein there is formed said liquid phases one containing the bulk of the amine-carbon dioxide reaction product and the other the bulk of the amine-hydrogen sulfide reaction product by virtue of the relative insolubility of the amine-carbon dioxide reaction product in the remainder of the solution, separately withdrawing and passing the hydrogen sulfide and carbon dioxide reaction product phases respectively through first and second separate heating zones, returning the liquid from said first heating zone to the top of the contacting zone and returning the liquid from said second heating zone to a lower location in the contacting zone.

FRED C. RIESENFELD.
HENRY D. FRAZIER.

REFERENCES CITED

The following references are of record in the file of this patent:

UNITED STATES PATENTS

| Number | Name | Date |
|---|---|---|
| 2,086,732 | Millar et al. | July 13, 1937 |
| 2,139,375 | Millar et al. | Dec. 6, 1938 |
| 2,143,393 | Ulrich et al. | Jan. 10, 1939 |
| 2,161,663 | Baehr et al. | June 6, 1939 |
| 2,177,068 | Hutchinson | Oct. 24, 1939 |
| 2,399,142 | Reed | Apr. 23, 1946 |
| 2,437,288 | Anderson | Mar. 9, 1948 |
| 2,445,468 | Blohm et al. | July 20, 1948 |
| 2,550,446 | Blohm et al. | Apr. 24, 1951 |